United States Patent
Sharawi et al.

(10) Patent No.: US 8,330,057 B2
(45) Date of Patent: Dec. 11, 2012

(54) SYSTEM AND METHOD FOR WEIGHING FOOD AND CALCULATING CALORIE CONTENT THEREOF

(75) Inventors: Mohammad Said Sharawi, Dhahran (SA); Osamah A. Rawashdeh, Rochester, MI (US)

(73) Assignee: King Fahd University of Petroleum and Minerals, Dhahran (SA)

( * ) Notice: Subject to any disclaimer, the term of this patent is extended or adjusted under 35 U.S.C. 154(b) by 362 days.

(21) Appl. No.: 12/656,026

(22) Filed: Jan. 13, 2010

(65) Prior Publication Data

US 2011/0168456 A1    Jul. 14, 2011

(51) Int. Cl.
*G01G 19/40*    (2006.01)
*G01G 21/28*    (2006.01)

(52) U.S. Cl. ............... 177/25.16; 177/25.19; 177/238; 177/262

(58) Field of Classification Search ............... 177/25.16, 177/25.19, 238, 244, 262; 128/921
See application file for complete search history.

(56) References Cited

U.S. PATENT DOCUMENTS

| | | | | |
|---|---|---|---|---|
| 1,440,070 A * | 12/1922 | Fry | ............... | 220/575 |
| 2,314,387 A * | 3/1943 | Carlsson | ............... | 434/127 |
| 2,700,284 A * | 1/1955 | Lyon, Jr. | ............... | 220/23.8 |
| 4,223,370 A | 9/1980 | Quere et al. | | |
| 4,223,750 A * | 9/1980 | Perego | ............... | 177/41 |
| 4,362,219 A * | 12/1982 | Carlsson | ............... | 177/245 |
| 4,387,777 A | 6/1983 | Ash | | |
| 4,911,256 A | 3/1990 | Attikiouzel | | |
| 5,007,743 A * | 4/1991 | Brennan | ............... | 374/141 |
| 5,033,561 A * | 7/1991 | Hettinger | ............... | 177/25.16 |
| 5,044,453 A * | 9/1991 | Bankier et al. | ............... | 177/25.16 |
| 5,064,009 A * | 11/1991 | Melcher et al. | ............... | 177/245 |
| 5,388,043 A * | 2/1995 | Hettinger | ............... | 600/300 |
| D376,295 S * | 12/1996 | Ahern et al. | ............... | D7/549 |
| D386,048 S * | 11/1997 | Bebawey | ............... | D7/549 |
| D434,605 S * | 12/2000 | Littlejohn et al. | ............... | D7/546 |
| 6,311,841 B1 * | 11/2001 | Hodges | ............... | 206/541 |
| 6,359,239 B1 | 3/2002 | Misler et al. | | |
| 6,541,713 B2 * | 4/2003 | White | ............... | 177/25.16 |
| 6,975,961 B1 | 12/2005 | Hong | | |
| 6,978,221 B1 * | 12/2005 | Rudy | ............... | 702/173 |
| 7,348,500 B2 | 3/2008 | Zhou | | |
| 7,541,548 B1 | 6/2009 | Sze et al. | | |
| 7,550,683 B2 * | 6/2009 | Daughtry | ............... | 177/126 |
| 7,851,711 B2 * | 12/2010 | Rump | ............... | 177/25.16 |
| 2002/0079142 A1 * | 6/2002 | White | ............... | 177/25.16 |
| 2002/0124017 A1 * | 9/2002 | Mault | ............... | 707/509 |
| 2004/0118618 A1 * | 6/2004 | Davidson et al. | ............... | 177/25.13 |
| 2005/0184148 A1 * | 8/2005 | Perlman | ............... | 235/383 |
| 2006/0015016 A1 * | 1/2006 | Thornton | ............... | 600/300 |

(Continued)

FOREIGN PATENT DOCUMENTS

WO    WO2009069149 A1    6/2009

*Primary Examiner* — Randy W Gibson
(74) *Attorney, Agent, or Firm* — Richard C. Litman

(57) ABSTRACT

The food calorie counting system relates to a calorie counting system that utilizes a container with at least one chamber for holding food materials, sensitive scales integrated into the chambers to weigh the food, and a processor to calculate the number of calories in the food items based on weight, type of food and method of preparation. The number of calories is then displayed on a display device to a user. The system may be used as a stand-alone device, or may further utilize an external central control unit where information from the container is transmitted to the external control unit for processing, food calorie calculation and transmission back to the containers for display.

10 Claims, 6 Drawing Sheets

U.S. PATENT DOCUMENTS

| | | |
|---|---|---|
| 2007/0050058 A1* | 3/2007 | Zuziak et al. ............... 700/90 |
| 2007/0173703 A1* | 7/2007 | Lee et al. .................. 600/300 |
| 2009/0020874 A1 | 1/2009 | Watanabe et al. |
| 2009/0205875 A1* | 8/2009 | Claypool ................ 177/25.13 |
| 2009/0205877 A1* | 8/2009 | Claypool ................... 177/239 |
| 2010/0038149 A1* | 2/2010 | Corel ..................... 177/25.16 |
| 2010/0089152 A1* | 4/2010 | Kolada et al. ................ 73/426 |
| 2010/0125176 A1* | 5/2010 | Hyde et al. ................ 600/300 |
| 2010/0125177 A1* | 5/2010 | Hyde et al. ................ 600/300 |
| 2010/0125178 A1* | 5/2010 | Hyde et al. ................ 600/300 |
| 2010/0125179 A1* | 5/2010 | Hyde et al. ................ 600/300 |
| 2010/0125180 A1* | 5/2010 | Hyde et al. ................ 600/300 |
| 2010/0125181 A1* | 5/2010 | Hyde et al. ................ 600/300 |
| 2010/0258356 A1* | 10/2010 | Anandampillai et al. . 177/25.16 |
| 2011/0297456 A1* | 12/2011 | Davidson et al. ............... 177/1 |

* cited by examiner

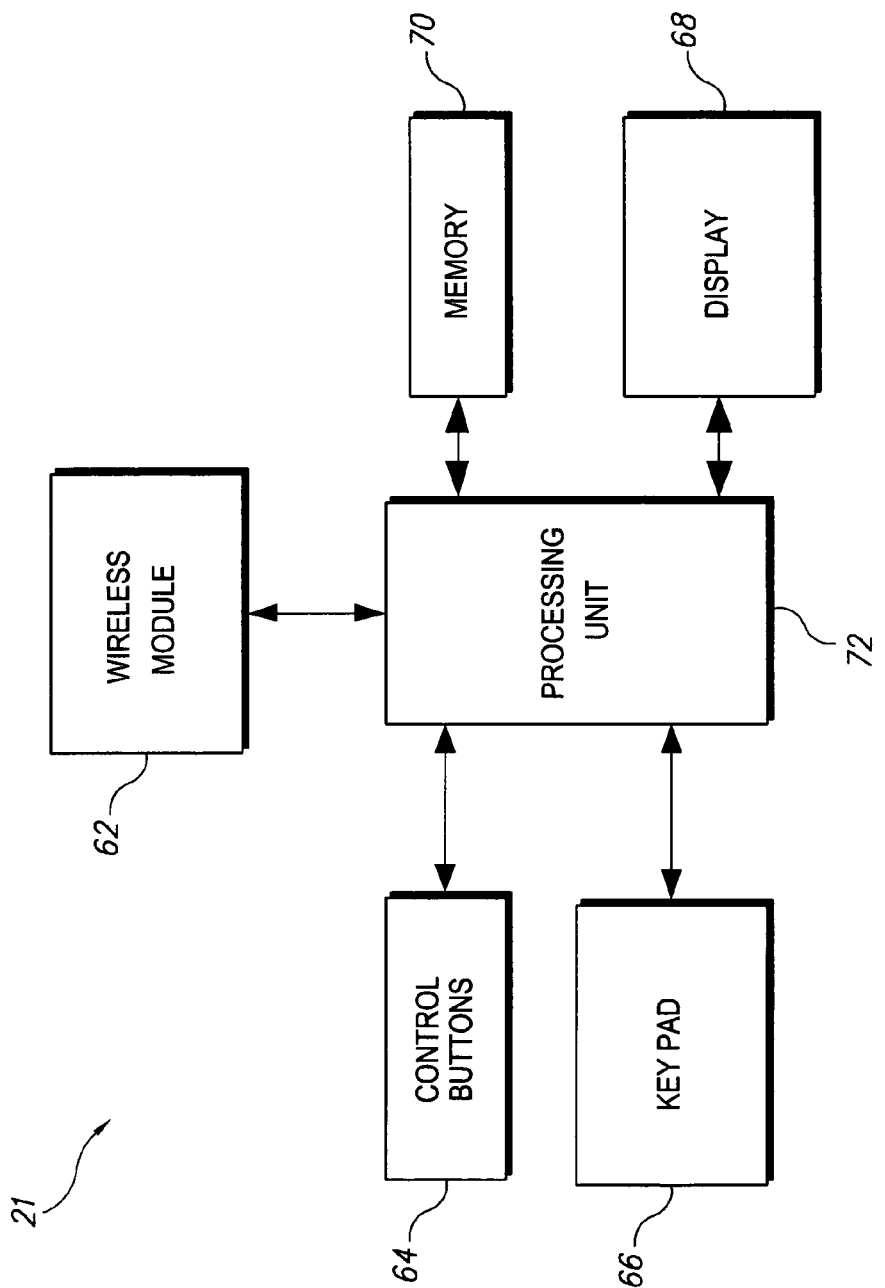

SYSTEM AND METHOD FOR WEIGHING FOOD AND CALCULATING CALORIE CONTENT THEREOF

BACKGROUND OF THE INVENTION

1. Field of the Invention

The present invention relates to dietary devices and methods, and particularly to a food calorie counting system that provides an estimate of the calories in food servings based upon the measured weight of the food and the food type.

2. Description of the Related Art

Our bodies need energy to perform. This energy is acquired. by eating different kinds of food. The food is digested and converted into energy that is burned to perform the basic bodily operations, or during physical exercise. If one takes in more energy than is needed for the daily basic operations and exercise, the extra energy will be converted into fat that is stored in the body. Thus, it is extremely important to control the amount of calories consumed in order to stay healthy. Two widely used energy measurement units are joules and calories. One kilojoule is equivalent to 0.239 calories.

To calculate the amount of energy that can be acquired from eating a certain type of food, the Atwater conversion factors are used. They are approved by the international Association of Analytical Communities (AOAC) and the USA Department of Agriculture (USDA). This method provides a crude calorie count per gram of a list of numerous food types. It also takes into account the way the food is prepared (fried, baked, etc.). It provides the amount of protein calories, carbohydrate calories, and fat calories per gram of a particular food using a particular method of preparation.

Diet watching plans and programs are gaining popularity among all categories of people. A person (male or female) in the age range of 20-40 years old is recommended to have a daily calorie intake of about 1800-2300 calories. This number can be easily exceeded if a person relies mostly on fast food or non-home cooked meals. Many of these diet-watching programs rely on the Atwater conversion factors to calculate the amount of calories per meal, and can provide persons with the actual amount of calories ingested, thereby aiding in not exceeding limits, and thus avoiding weight gain.

The daily amount of calories needed depends on several factors, such as the age, gender, height and the weight of the person. A widely used formula for calculating the daily calories requirement for males and females is the Harris-Benedict equation that relates daily calorie requirements to the weight, height and age of the person. The daily calorie count is also denoted as Basal Metabolic Rate (BMR). Equations 1 and 2 show these equations for males and females.

$$BMR_{men} = 66 + (13.7 \times W) + (5 \times H) - (6.76A) \quad (1)$$

$$BMR_{women} = 655 + (9.6 \times W) + (1.8 \times H) - (4.7 \times A) \quad (2)$$

In the equations, W is weight in kilograms, H is height in centimeters and A is age in years. For a person with little or no daily exercise, the daily calories needed are given by BMR×1.2. It is worth noting that these equations do not take into account excess calories from body fat or muscle mass. There are other factors that are used to account for these situations based on the amount of exercise per week.

Thus, a food calorie counting system solving the aforementioned problems is desired.

SUMMARY OF THE INVENTION

In one embodiment, the food calorie counting system relates to a stand-alone calorie counting system that utilizes a container with one or more chambers for holding food materials. Sensitive scales are integrated within the container to weigh the food, and information about the type of food and the method of preparation are provided as inputs from the user. The number of calories in the food items is then calculated based on weight, type of food and method of preparation, the data for which is stored in electronic memory. The number of calories is then displayed on a display device located on the container.

In a further embodiment, the food calorie counting system relates to an electronic system in which an external central control unit is used in place of the internal electronics in the stand-alone calorie counter described above to store and process information about calories associated with the weight of different foods and different ways of preparing the foods. In this embodiment, any number of containers having one or more chambers for holding food may be utilized. The containers have sensitive scales integrated into the container, and the weights of foods are transmitted to a central control unit where a memory module is used to store information about calories associated with different food types and different ways of preparing food. The central control unit then calculates food calories based on the weight of the food determined by the scales and information provided by the user about food type and preparation, and transmits this information back to the containers for display.

Yet another embodiment of the food calorie counting system relates to a method for electronically calculating food calories. The method involves weighing food in a container with embedded scales, recording the information about the weight of the food, and providing further information about the food type and preparation to a central processing unit. The central processing unit then utilizes the information about the food and its and weight in order to calculate and display the number of food calories.

These and other features of the present invention will become readily apparent upon further review of the following specification and drawings

BRIEF DESCRIPTION OF THE DRAWINGS

FIG. 7 is a block diagram of a central control unit in a food calorie counting system according to the present invention.

Similar reference characters denote corresponding features consistently throughout the attached drawings.

DETAILED DESCRIPTION OF THE PREFERRED EMBODIMENTS

The food calorie counting system is capable of providing a calorie count based on the weight and type of food within that container. The calorie measurement and count can be performed in the container as a stand-alone system, where the electronics, scales and display are in one location (the container), or it may be performed partially in the container and partially in a central processing location, or it can be performed totally in a centralized weighing and calorie counting station where the container is just a regular container that has no smart sensors or electronics.

Figure 1:
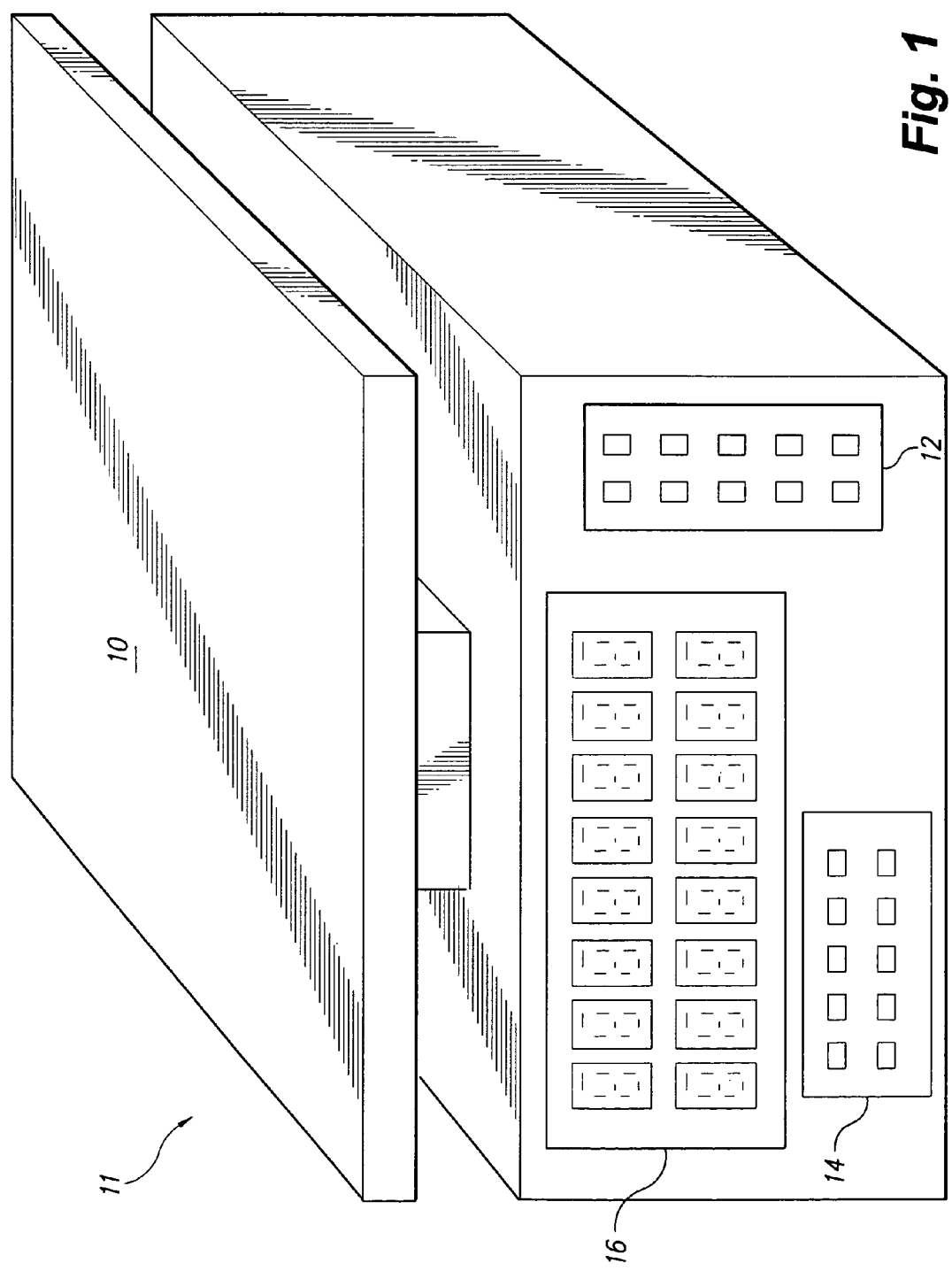
FIG. 1 is an environmental, perspective view of a food calorie counting system according to the present invention, showing a stand alone centralized system that can be used to provide the calorie count in a food container based on the food type and weight.

FIG. 1 shows an embodiment of the food calorie counting system that includes an electronic scale, generally referred to as 11, that can be used to provide the calorie count in a food container based on the food type and weight. The scale 11 has a platform 10 upon which a container of food is placed. The user interacts with a central processing unit (CPU) housed within the scale 11 through keys 12 and buttons 14 to choose the type of food and the way it was prepared. The container is tared, and the food is then added to the container while on the scale 11. The scale measures the weight of the food, and an internal program in the CPU will then calculate the amount of calories according to weight, type of food, and food preparation method of the food serving. The result is shown on the display 16, e.g., a liquid crystal display (LCD). If a different type of food is to be added, the procedure is repeated, and the added weight of the new type of food entered, and, thus, the combined total number of calories can be displayed and repeated as desired. This method does not require special containers, and any regular food container can be used on the calorie counting system shown in FIG. 1.

Figure 2:
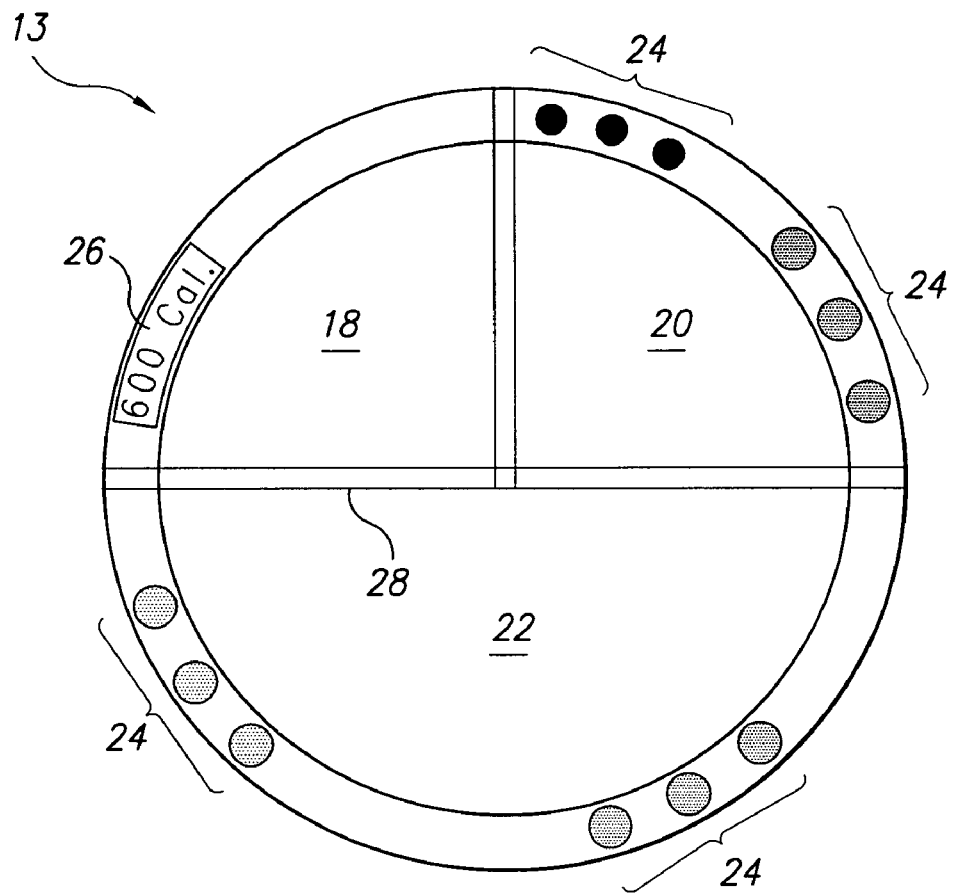
FIG. 2 is a top view of an alternative embodiment of a food calorie counting system according to the present invention, showing a stand-alone electronic container having an integrated scale for measuring the weight of food.
Figure 3:
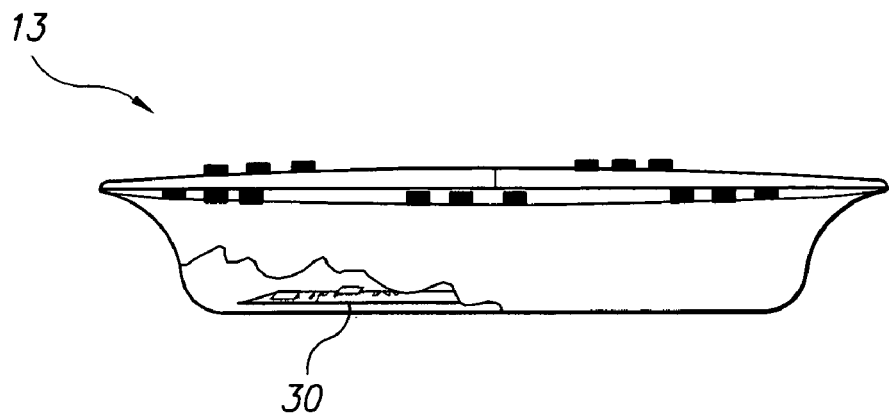
FIG. 3 is a side view of the system of FIG. 2, the container being broken away to show the embedded electronics.

Another embodiment of the food calorie counting system is shown in FIG. 2 and FIG. 3. This embodiment represents a stand-alone smart container, generally referred to as 13. FIG. 2 represents a top view of the electronic container 13 with calorie counting capability, and shows the three main food chambers or compartments 18, 20 and 22, and the various selection buttons 24 on the periphery of the container. A display screen 26 provides information to the user, whether it is a message or the actual calorie count for the food inserted. Display screens may be of many types known in the art, exemplary examples including light emitting diodes, liquid crystal displays, and plasma screens.

The container 13 is made from a material that can withstand high temperatures so that the container 13 can be put in a dishwasher. The periphery of the container 13 contains a display screen 26 for information and calorie count indication. The three food chambers 18, 20 and 22 have sensitive independent scales that can measure food within one gram of accuracy. The scales are integrated within the container material, and have three major divider walls 28 between them. Each chamber may be used for a certain food type, and this will aid in the calorie counting procedures.

There are several button groups 24. Some of the groups 24 are for control functions, and others are for description of food type. Some buttons are responsible for on/off or power operation, and others are for control functions, such as resuming the count for the day, or starting a new day count. Some are responsible for different food types, while others are responsible for the way the food was prepared, e.g., fried, baked, boiled, roasted etc.

Once a food of a certain type is placed inside a container compartment 18, 20, or 22, the user informs the embedded electronics (e.g., a processor, computer readable memory, and related circuitry) through the use of the control buttons on the container 13 of the type of food and the type of preparation that applies (in terms of cooked food). This process is repeated for each compartment 18, 20, and 22, and when all the scales indicate that food has been placed in them, or if the user wants to calculate the calories for one, two or three compartments 18, 20, and 22, the user can press the control buttons 24 and obtain the calorie count. The food calories will appear in the display 26.

FIG. 3 shows a side view of container 13. FIG. 3 shows an exemplary physical location for the embedded electronics used for storage of the database for the calorie counts per food type, taking and storing the scale readings, interpreting the button combinations selected, calculating the final calorie count and displaying it on the display 26 on the side of the container. The electronics portion should be waterproof (or water isolated), since it is desired that the container be dishwasher safe. Also, a battery replacement compartment may be desirable in case an internal battery needs replacement. Finally, the electronics should be able to withstand high temperatures due to the desire to clean the container in an automatic dishwasher.

Figure 4:
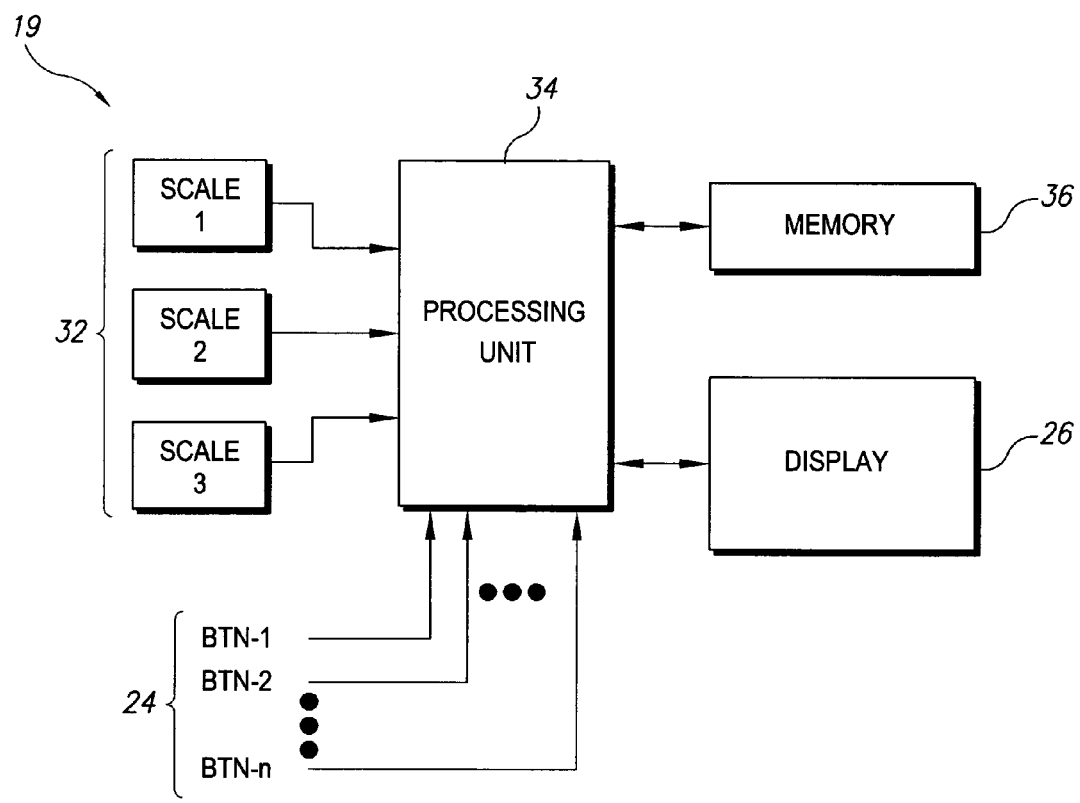
FIG. 4 is a block diagram of the electronic circuit for the food counting calories system of FIGS. 2 and 3.

FIG. 4 shows a block diagram 19 of the embedded electronics in the container 13 of FIGS. 2 and 3. The food weight measurements from the scales 32 incorporated into the food compartments 18, 20 and 22 are passed to a central processing unit 34. The processing unit 34 receives the button inputs from the user through the various buttons 24, and based on the button selection and the received weight from the scales 32, and retrieves the appropriate calorie counts per gram of the food type present in the respective scale from a database in the computer readable memory 36. Exemplary information inputted by the user includes the type of food and the food preparation method. The processing unit then calculates the calorie count and displays it on the screen 26 on the container periphery.

Figure 5:
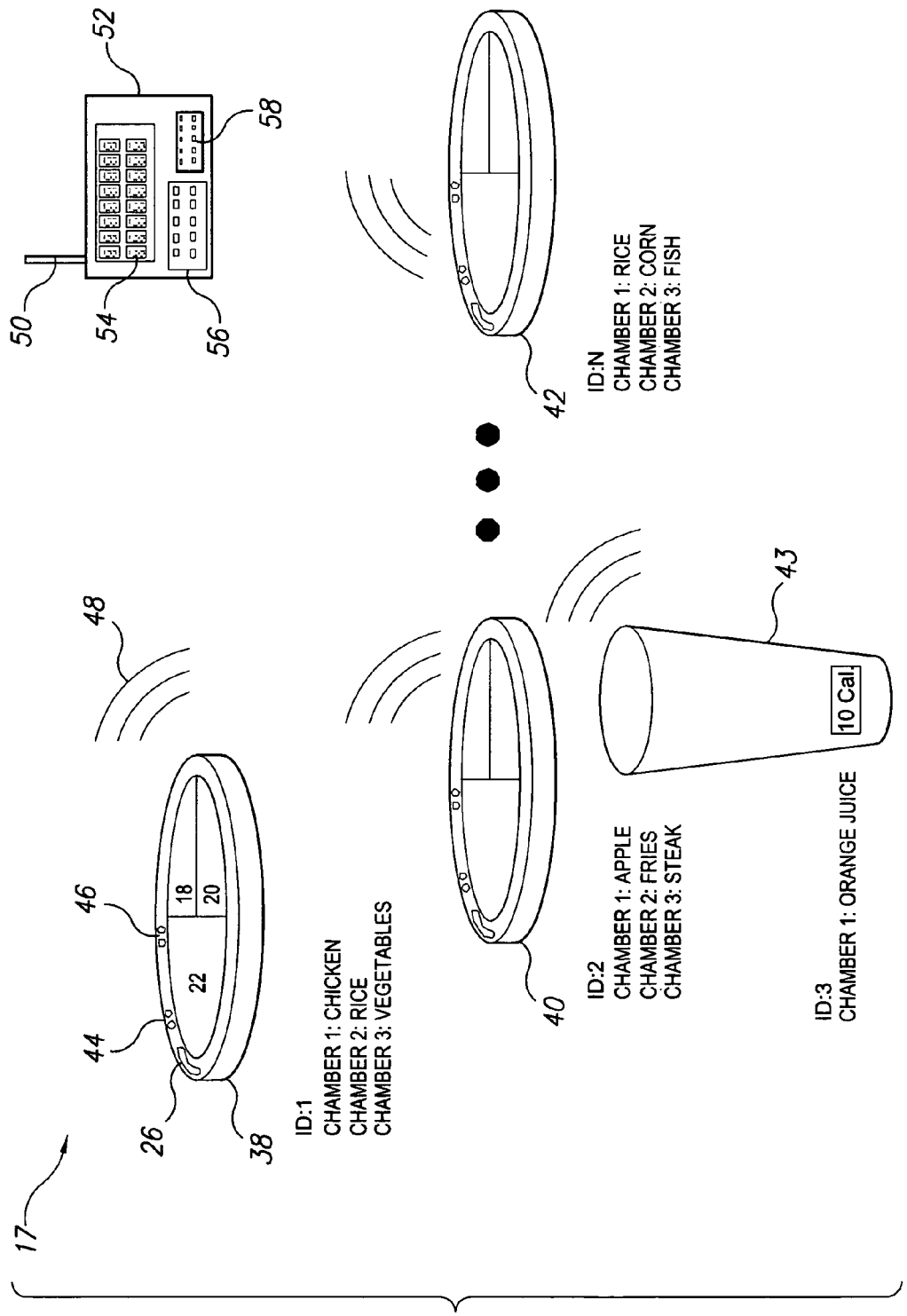
FIG. 5 diagrammatic sketch of another alternative embodiment of a food calorie counting system according to the present invention, the system having a wireless system and an external central processing unit.

FIG. 5 shows a further embodiment of the food calories counting system, designated generally as system 17. The system 17 may include several different containers 38, 40, 42 that communicate with a central control unit. Each container 38, 40, 42 will be assigned a unique identification number (ID) and each compartment (section) of each container will be uniquely identified as, for example, ID numbers 1, 2 and 3, respectively as shown for the containers 38, 40 and 42 in FIG. 5. The design of the container 38, 40, 42 follows that in FIGS. 2 and 3, except that the periphery will contain fewer buttons because the external central control unit will take care of most of the processing functions. Each container 38, 40, 42 will have a display 26 to show the calorie count based on the food placed in each container section (compartment). Button groups 44 and 46 will have limited functionality to, for example, turn the container on or off, resume calorie counts or reset them etc., as well as recalculating counts in cases of refills. The three compartments (sections) 18, 20 and 22 contain sensitive scales for food measurements to within one-gram accuracies. The scales are embedded into the container material, and sealed to avoid any water leak during the dishwashing process.

The container 38, 40, 42 will communicate with the central control/processing unit via a wireless link 48. The control unit consists of an antenna 50, an enclosure 52 for the electronics and embedded processor, a display screen 54, control buttons 56 and a keypad 58. The display screen 54 is used to pick the appropriate foods and the type of preparation. A program that will prompt the user for interaction through the keypad 58 and control buttons 56 will be stored in the memory along with the food database. The user will select the container ID from the keypad 58, and through interaction with the program loaded via the control buttons 56, the user will be able to inform the processing unit about the types of food in the various compartments 18, 20, 22 for the container 38 of interest, receive the food weight via the wireless link, calculate its calorie count, and send this information to the container 38. This will reduce the complexity of the electronics in a single container 38, and will allow for a centralized processing scheme. The food database will be stored in the memory of the central control unit. Two other similar containers are shown 40 and 42, as well as a different container 43 that does not include compartments, but does contain an embedded scale and is otherwise similar to containers 38, 40 and 42. The number of containers supported will vary based on the hardware allocated. The containers should be waterproof with respect to the electronics, the electronics should be able to withstand high temperatures, and the materials that form the containers should also be able to withstand high temperatures in order to be dishwasher safe.

Figure 6:
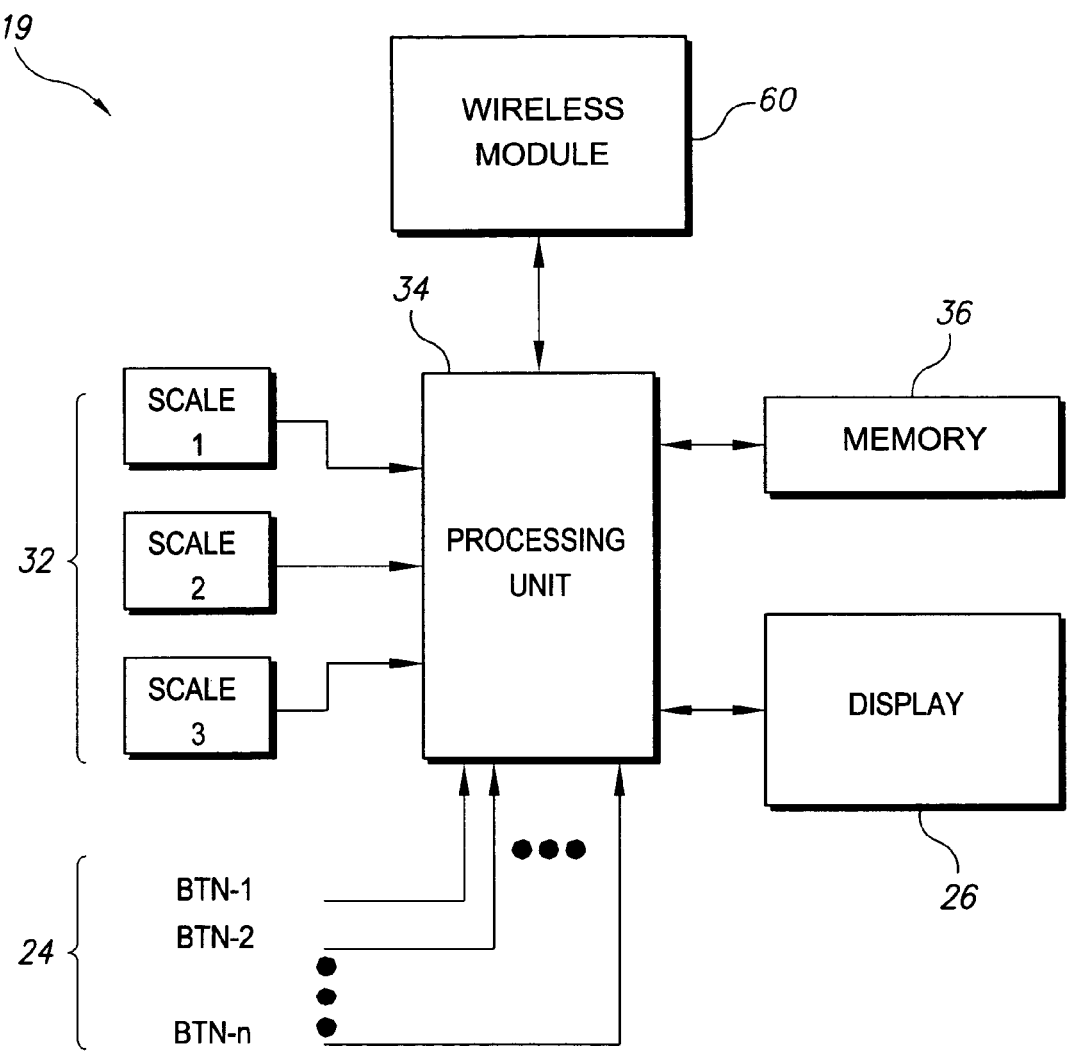
FIG. 6 is a block diagram showing the internal components of one of the containers of FIG. 5.

FIG. 6 is a block diagram of the electronic components of a single container 19 in the wireless calorie counting system. The processing unit 34 will receive the food weight and basic function commands from the scales 32 and control buttons 24. A computer readable memory unit 36 will hold the data and a wireless module 60 will transfer the data to a central control unit for processing. The process is repeated for all containers identifiable by the system.

FIG. 7 is a block diagram, generally referred to as 21, of the central control unit. The wireless module 62 and antenna 50 are responsible for the transmission and reception of data from the different containers 38, 40, 42, 43. The control buttons 64 and the keypad 66 will help the user navigate through the embedded program to choose the food types, and the way they were prepared. The processing unit 72 will calculate the calorie count per container based on the received information from the wireless module for the specific container ID, will then display the calorie count on the main screen 68, as well as transmit the value to the container with that ID via the wireless link. The container 38, 40, 42, 43 then displays the calorie count on its screen.

It is to be understood that the present invention is not limited to the embodiments described above, but encompasses any and all embodiments within the scope of the following claims.

We claim:

1. A food calorie counting system, comprising:
a container having a plurality of compartments for holding food items, said container defining an open recess, at least one partition wall being received within the open recess to divide the open recess into the plurality of compartments, such that the plurality of compartments are positioned adjacent and contiguous to one another, wherein each said compartment is adapted for directly receiving and holding a unique one of the food items;
at least one electronic scale for measuring the weight of the food items in each of said compartments, the scale being embedded within the container, wherein said at least one electronic scale comprises a plurality of electronic scales, each said scale corresponding to a respective one of said plurality of compartments;
means for inputting information about the food items;
means for receiving the inputs;
means for calculating the number of calories in the food items;
means for receiving the calculated information about the food calories in the container; and
means for displaying the calculated information about the food calories in the container to a user.

2. The food calorie counting system of claim 1, wherein said means for calculating the number of calories comprises a computer readable memory for storing information and a processor for computing calories in the food items, the computer readable memory being connected to the processor.

3. The food calorie counting system of claim 1, wherein said electronic scales have an accuracy of at least one gram.

4. The food calorie counting system of claim 1, wherein the means for receiving inputs and the means for calculating calories are secured within the container by a waterproof seal.

5. The food calorie counting system of claim 1, wherein the means for inputting information is selected from the group consisting of selection buttons, control buttons and keyboards.

6. A food calorie counting system, comprising:
a plurality of containers, each having a plurality of compartments for holding food items, each said container defining an open recess, at least one partition wall being received within the open recess to divide the open recess into the plurality of compartments, such that the plurality of compartments are positioned adjacent and contiguous to one another, wherein each said compartment is adapted for directly receiving and holding a unique one of the food items;
at least one electronic scale for measuring the weight of the food items in each of said compartments, the electronic scale being embedded within the container, wherein said at least one electronic scale comprises a plurality of electronic scales, each said scale corresponding to a respective one of said plurality of compartments;
means for inputting information about the food items;
means for receiving the inputs;
means for storing the inputs;
an external central control unit, the central control unit comprising means for receiving and transmitting data, a computer readable memory for storing data, a processor for calculating the number of calories in the food items and a transmitter for transmitting the food calories calculated by the processor to the containers;
means for wirelessly transmitting data relating to the weight of the food and the information about the food items to the external central control unit; and
means for displaying the calculated information about food calories in the container to a user.

7. The food calorie counting system of claim 6, wherein said electronic scale has an accuracy of at least one gram.

8. The food calorie counting system of claim 6, wherein the means for receiving, storing and transmitting inputs are housed within the container by a waterproof seal.

9. The food calorie counting system of claim 6, wherein the means for inputting information to the external central control unit is selected from the group consisting of control buttons and keyboards.

10. The food calorie counting system of claim 6, wherein the means for displaying the calories is selected from the group consisting of a light emitting diode, a liquid crystal display and a plasma screen.

\* \* \* \* \*